(12) United States Patent
VanBlon et al.

(10) Patent No.: US 9,990,921 B2
(45) Date of Patent: Jun. 5, 2018

(54) USER FOCUS ACTIVATED VOICE RECOGNITION

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 14/964,078

(22) Filed: Dec. 9, 2015

(65) Prior Publication Data

US 2017/0169818 A1   Jun. 15, 2017

(51) Int. Cl.
| | | |
|---|---|---|
| *G10L 15/22* | (2006.01) | |
| *G06F 3/01* | (2006.01) | |
| *G06K 9/00* | (2006.01) | |
| *G06T 7/20* | (2017.01) | |
| *G10L 15/24* | (2013.01) | |
| *G06F 3/16* | (2006.01) | |
| *G06F 3/03* | (2006.01) | |

(52) U.S. Cl.
CPC .............. *G10L 15/22* (2013.01); *G06F 3/012* (2013.01); *G06F 3/013* (2013.01); *G06F 3/0304* (2013.01); *G06F 3/167* (2013.01); *G06K 9/0061* (2013.01); *G06K 9/00335* (2013.01); *G06T 7/20* (2013.01); *G10L 15/222* (2013.01); *G10L 15/24* (2013.01); *G06F 2203/0381* (2013.01); *G10L 2015/226* (2013.01)

(58) Field of Classification Search
None
See application file for complete search history.

(56) References Cited

U.S. PATENT DOCUMENTS

| | | | |
|---|---|---|---|
| 2002/0105575 A1 | 8/2002 | Hinde et al. | |
| 2012/0295708 A1* | 11/2012 | Hernandez-Abrego | A63F 13/424 463/36 |
| 2013/0304479 A1* | 11/2013 | Teller | G06F 3/013 704/275 |
| 2013/0307771 A1* | 11/2013 | Parker | G06F 3/013 345/158 |
| 2013/0342672 A1 | 12/2013 | Gray et al. | |
| 2014/0184550 A1* | 7/2014 | Hennessey | G06F 3/013 345/173 |
| 2014/0350942 A1* | 11/2014 | Kady | B60R 16/0231 704/275 |
| 2015/0062168 A1* | 3/2015 | Ng-Thow-Hing | G02B 27/01 345/633 |

(Continued)

FOREIGN PATENT DOCUMENTS

| | | |
|---|---|---|
| EP | 2806335 A1 | 11/2014 |
| WO | 2012158407 A1 | 11/2012 |

*Primary Examiner* — Douglas Godbold
(74) *Attorney, Agent, or Firm* — Ference & Associates LLC

(57) ABSTRACT

One embodiment provides a method, involving: receiving, at a device, voice input comprising at least one command; identifying, using an image of the user, a direction of user focus; and responsive to the identifying that the direction of user focus is directed toward the device, performing an action based on the at least one command. Other aspects are described and claimed.

18 Claims, 3 Drawing Sheets

(56) References Cited

U.S. PATENT DOCUMENTS

| | | | |
|---|---|---|---|
| 2015/0109191 A1* | 4/2015 | Johnson | G10L 15/22 345/156 |
| 2015/0207957 A1* | 7/2015 | Lee | G06F 3/1208 358/452 |
| 2015/0254053 A1* | 9/2015 | Gardner | G05B 15/02 700/83 |
| 2015/0268719 A1* | 9/2015 | Li | G06F 3/013 345/156 |
| 2015/0269943 A1 | 9/2015 | VanBlon et al. | |
| 2015/0278599 A1* | 10/2015 | Zhang | G06K 9/00604 348/78 |
| 2015/0324562 A1* | 11/2015 | Scavezze | G06F 21/31 345/156 |
| 2015/0340029 A1* | 11/2015 | Kunieda | G10L 15/25 704/249 |
| 2015/0348550 A1* | 12/2015 | Zhang | G06F 3/167 704/235 |
| 2016/0026431 A1* | 1/2016 | Yi | G06F 3/165 345/156 |
| 2016/0109945 A1* | 4/2016 | Kempinski | G06F 3/013 348/78 |
| 2016/0116978 A1* | 4/2016 | Li | G06F 3/013 345/156 |
| 2016/0132290 A1* | 5/2016 | Raux | G06F 3/167 704/275 |
| 2016/0179462 A1* | 6/2016 | Bjorkengren | G06F 3/167 704/275 |
| 2016/0189717 A1* | 6/2016 | Kannan | G10L 17/22 704/275 |

* cited by examiner

USER FOCUS ACTIVATED VOICE RECOGNITION

BACKGROUND

With the creation of intelligent digital personal assistants, (e.g., SIRI, S Voice, GOOGLE NOW, CORTANA, etc.) the use of voice commands to control electronic devices has become extremely popular. Generally, a user interacts with a voice input module, for example embodied in a personal assistant through use of natural language. This style of interface allows a device to receive voice inputs such as voice commands from a user (e.g., "What is the weather tomorrow," "Call Dan"), process those requests, and perform the user's desired actions by carrying out the task itself or delegating user requests to a desired application. SIRI is a registered trademark of Apple Inc. in the United States and other countries. S VOICE is a registered trademark of Samsung Electronics Co. in the United States and other countries. GOOGLE is a registered trademark of Google Inc. in the United States and other countries. CORTANA is an unregistered trademark of Microsoft in the United States and other countries.

Because natural language is a method of communication people are typically comfortable with, the ability to use voice commands offers a natural and efficient way to utilize functions of a device's operating system or applications, no matter how simple or complex. However, one of the major issues when utilizing the personal assistants is determining what portion of a user's speech is intended to be received as a voice command. Constantly listening to the user has proven too difficult a task to achieve with a usable level of false positives (i.e., the assistant responding to unrelated speech) and false negatives (i.e., the assistant ignoring user commands). In addition, the personal assistant can be an energy intensive application, thus allowing it to run constantly in the background could have a significant impact on battery life. In order to overcome this issue, most voice controlled assistants today make use of some form of trigger to initiate the voice recognition process. This trigger assumes that any speech directly following the trigger is a command directed to the assistant. Some common triggers are physical button presses (e.g., SIRI activation) or special key phrases spoken before any system-directed command (e.g., Okay GOOGLE).

BRIEF SUMMARY

In summary, one aspect provide a method, comprising: receiving, at a device, voice input comprising at least one command; identifying, using an image of the user, a direction of user focus; and responsive to the identifying that the direction of user focus is directed toward the device, performing an action based on the at least one command.

Another aspect provides an information handling device, comprising: a processor; an audio capture device operatively coupled to the processor; and a memory that stores instructions executable by the processor to: receive, at the audio capture device, voice input comprising at least one command; identify, using an image of the user, a direction of user focus; and responsive to the identifying the direction of user focus is directed toward the information handling device, performing an action based on the at least one command.

A further aspect provides a product, comprising: a storage device having code stored therewith, the code being executable by the processor and comprising: code that receives, at an audio capture device, voice input comprising at least one command; code that identifies, using an image of the user, a direction of user focus; and code that responsive to the identifying a direction of user focus is directed toward the audio capture device, performs an action based on the at least one command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
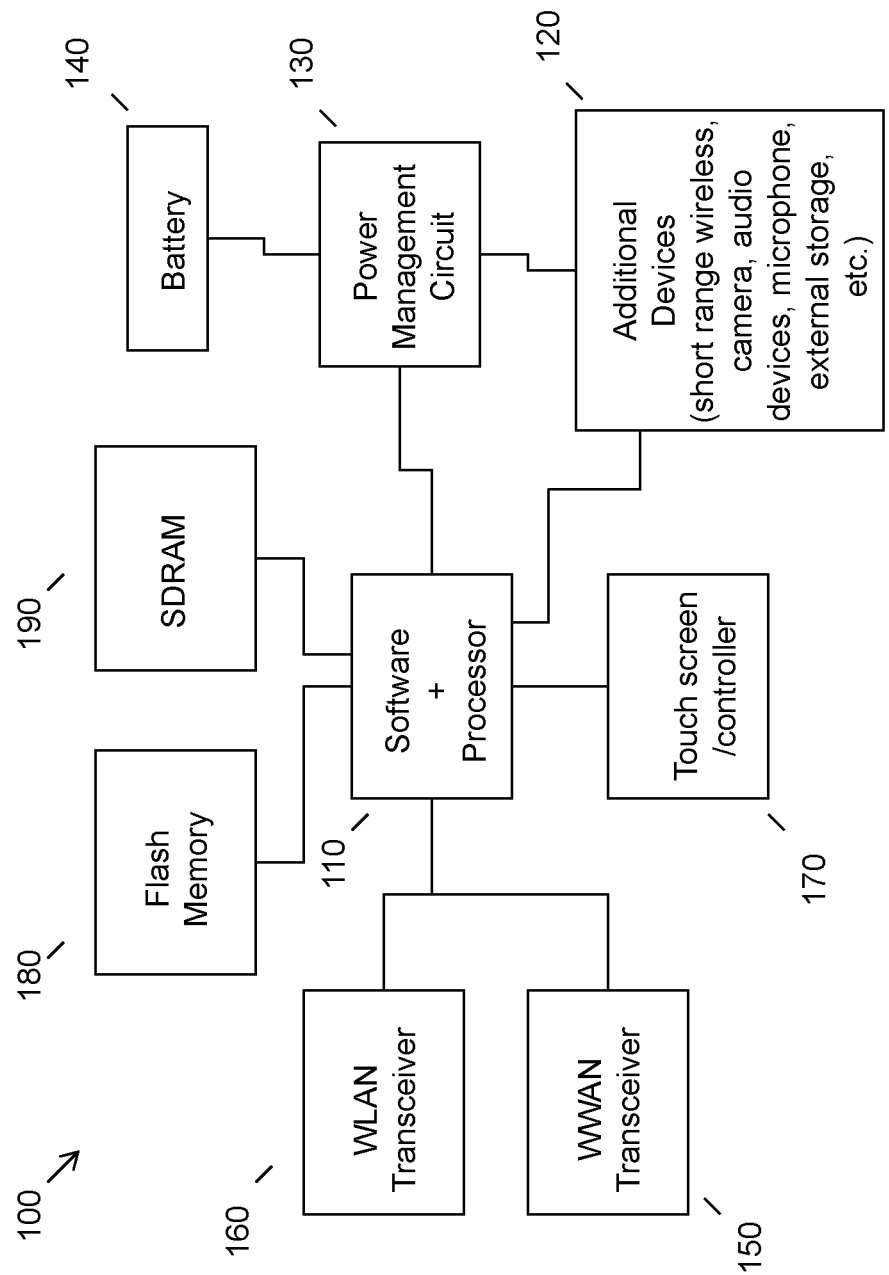
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Some currently available commercial systems use triggers that require the pressing of a particular button (e.g., pressing and holding the home button to activate SIRI virtual assistant, or pressing and holding the search button to activate CORTANA virtual assistant). An alternative method currently available is the use of a key phrase (e.g., saying "Hey SIRI" while using a device running iOS 8 or later or saying "Okay GOOGLE" while a device running ANDROID 4.3 is awake). Once a user speaks a key phase, the device is triggered to listen for the voice commands following the key-phrase. ANDROID is a registered trademark of Google Inc. in the United States and other countries.

Other solutions exist such as "raise to speak," wherein a user raises a device (e.g., a mobile device) and the motion is detected (e.g., using an accelerometer). This solution only applies to handheld or wearable devices and will not work if a user is currently holding their device in an upright fashion. The main issue with the current methods of activating a trigger is that they tend to disrupt whatever task the user is currently involved in. In particular, if a user is involved in performing a task that requires use of their hands (e.g., using a computer, doing house work, cooking, etc.). With regard to the trigger phases, their constant and repetitive nature creates a burden on the user and undercuts the benefit of the natural language aspect of the intelligent assistant, which is one of its primary qualities.

Thus, an embodiment uses head or eye tracking to auto-enable a listening mode for a device (e.g., an intelligent assistant). As it may be difficult to track a user's eyes or gaze from across a room, an embodiment may use head tracking in larger spaces. Additionally, two or more cameras (or a wide angle camera) may be utilized in a particular space to ensure proper coverage of all areas of a room. For simplicity purposes, throughout this document, reference will be made to "user focus" which should be understood to be determined via a head tracking system, eye tracking system, facial recognition system, or any system capable of determining where a user's focus is directed.

In an example embodiment, if a user looks at a device and gives a command, the command is processed. However, if it is determined that the user is looking away from the device, the command is ignored. In a one embodiment, the device is constantly listening and receiving voice input, but only takes an action if it is determined that the user is looking at the device. Thus, an embodiment may continue to process speech even after a user looks away. In this way, the user focus acts in a manner similar to a trigger phrase or haptic key in that it simply activates a "wake mode" and allows a device to process the received user input. Thus, the current sentence or user command would be processed (e.g., until the user pauses speaking).

Alternatively, an embodiment may stop processing the voice input if a user's focus changes or is directed away from the device. Thus, any command or request issued after user focus was broken would be ignored. This would allow a user to cancel a command mid-sentence. In a further embodiment, a user may be able to look at the device shortly after starting to issue a command and have the entirety of the command accepted. For example, if a user forgets to look at the device, they could look at it shortly after they begin speaking. In one embodiment, the device may maintain a rolling buffer of spoken input and capture the last command from the input buffer immediately before the user's focus was directed toward the device.

Additionally or alternatively, a user focus could be tracked by any device that has a sensor device (e.g., infrared, optical, time-of-flight camera, radio wave, etc.). The additional device may be, for example, an accessory to the main device or a stand alone device that can communicate with the main device. In a further embodiment, the accessory may be powered while the device itself is un-powered. This would allow the accessory device to "wake up" the non-powered main device when needed via a communication standard (e.g., short range wireless, wireless LAN, wireless WAN, etc). Additionally, if no users are nearby (e.g., in range of the sensor(s)) the device may enter a low power mode. An embodiment may exit the low power mode based on proximity detection using, for example, short range wireless, GPS, etc.

In a further embodiment, user focus may be used in conjunction with a trigger phrase or wake up word to increase confidence of wake up word detection. This could be advantageous for example in a loud room. In a loud environment, it may be difficult to capture or detect the trigger phrase or wake up word. Thus, if an embodiment determines that background noise of a particular environment exceeds a threshold, the wakeup word may be used in conjunction with the user's focus to increase confidence in the detection. Alternatively, an embodiment may completely disable the use of a trigger phrase in a noisy environment and rely solely on detection of user focus.

The example embodiments described herein could relate to any device including laptops, tablets, smartphones, wearable technology (e.g., smart watches), audio assistants (e.g., an AMAZON ECHO device), etc. It should be noted that while examples are provided herein focusing on an intelligent assistant, these examples are non-limiting and the general techniques may be applied to voice modules generally, such as provided for dictation in forms or within applications generally. AMAZON ECHO is used as a trademark by Amazon Technologies, Inc. in the United States and other countries.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio input device such as a microphone that processes analog audio into a digital input signal and a camera for capturing image data. System 100 often includes a touch screen 170 for data input and display/rendering. System 100 also typically includes various memory devices, for example flash memory 180 and SDRAM 190.

Figure 2:
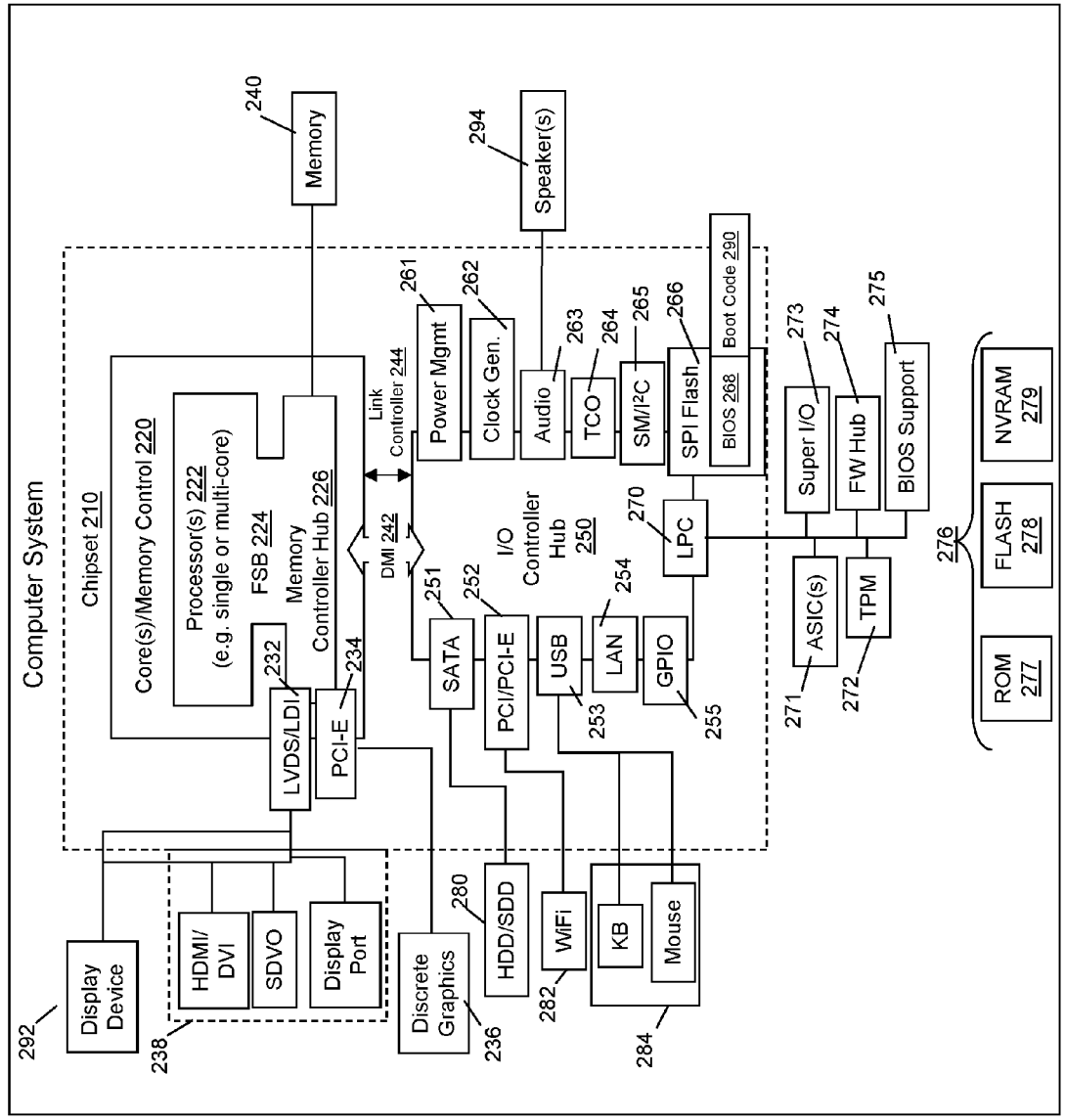
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, Intel Corporation, Advanced Micro Devices, Inc., ARM Holdings PLC, etc.). The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may issue voice commands in order to perform specific actions. For example, the circuitry outlined in FIG. 1 may be implemented in a tablet or smart phone embodiment, whereas the circuitry outlined in FIG. 2 may be implemented in a personal computer embodiment.

It will be understood that such devices (e.g., a tablet computing device, personal computer, or smartphone) primarily offer touch screens, microphones and cameras as primary input devices, with current devices relying primarily on the touch screen and microphone inputs for application control. In an embodiment, fusion of such modalities provides a more user friendly experience, particularly for certain applications that may warrant the use of other input modalities not supported by such devices.

Figure 3:
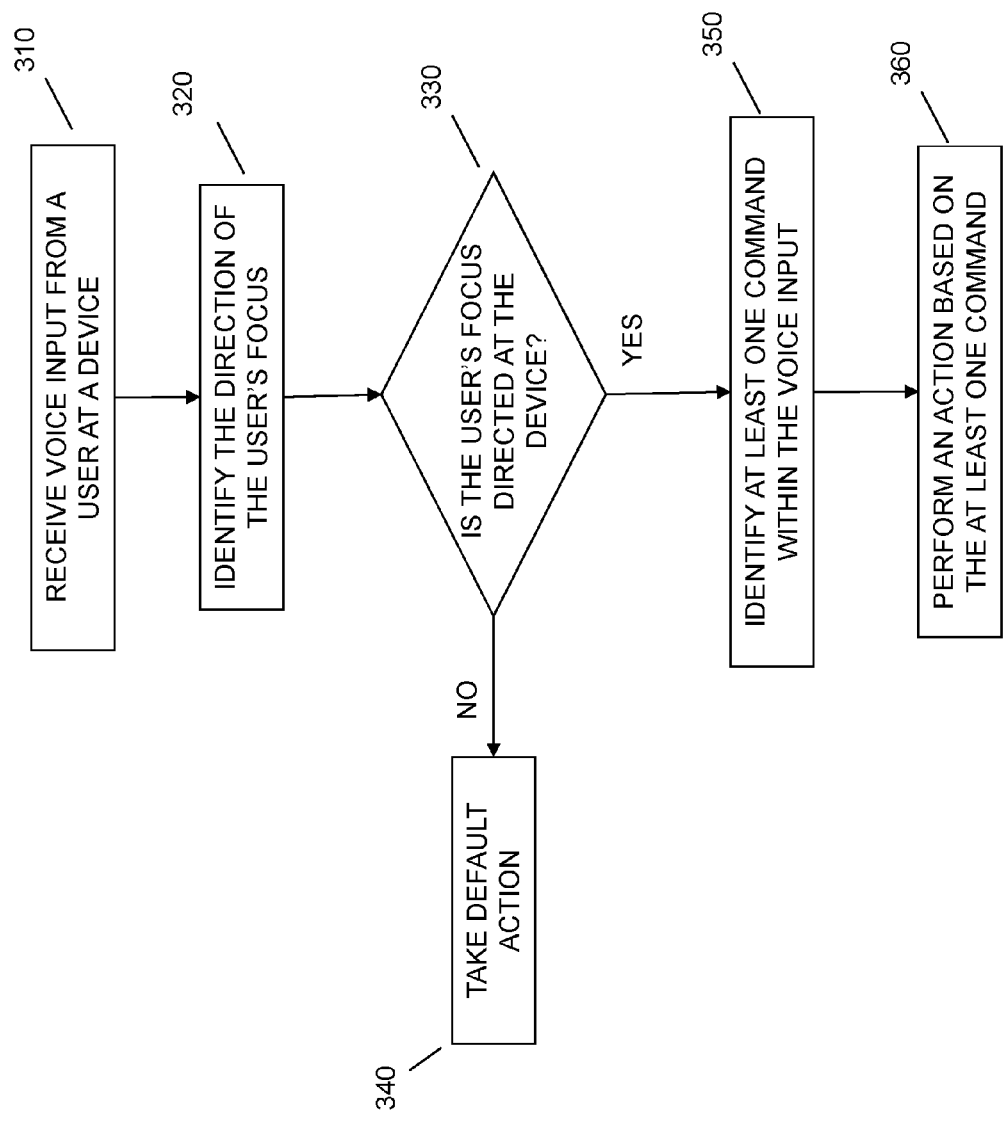
FIG. 3 illustrates an example method of user focus activated voice recognition.

By way of example, and referring now to FIG. 3, an embodiment receives voice input from a user at a device at 310. The audio is captured via an audio capture device, which may be operatively attached to the device, or remotely located.

A further embodiment tracks the focus of a user at 320. This tracking may be done at the device itself, via a sensor or array of sensors (e.g., an image capture device, a video capture device, a range imaging device, and a 3D scanning device, etc.). The sensor or sensor array may be a passive detection system, an active detection system, or a combination of the two. Additionally or alternatively, the tracking maybe done by a single remote sensor or a plurality of remote sensors. Locating sensors in various positions throughout a space allows for a more robust tracking system.

Once the direction of the user's focus is determined at 320, an embodiment may determine if the user's focus is directed toward the device (e.g., mobile device, intelligent personal assistant device, computer, etc.) at 320. If it is determined that the user's focus is not directed toward the device, an embodiment may take no action at 340. Alternatively, if it is determined that the user's focus is directed at the device, an embodiment may determine that the user is directing the voice input toward the device (i.e., that the user intends the voice input to be a command).

In an additional embodiment, the user's focus may be directed toward a secondary device (e.g., the television, light switch, radio, etc.), which the user intends to interact with. For example, the user may look at the TV and request the TV be turned on by the device. Thus, an embodiment may not only determine that the user's focus is directed toward the device, but may also determine that the user's focus is directed toward a secondary and carry out the user's command on that specified device.

A further embodiment may also provide an indication or acknowledgement to the user if it is determined that the user's focus is directed toward the device. The indication may be visual or auditory in nature. For example, the device may illuminate with a particular color to indicate a determination of user focus. Alternatively, the audio capture device may play a particular sound (e.g., bells, horn, etc.) or give a verbal confirmation (e.g., saying "Hello User") when it identifies that the user's focus is directed toward it. An embodiment may also use a combination of the visual and/or auditory indicators. Additionally, the indication style may be adjusted by the user based on user preference.

Based on the determination that the user's focus is directed toward the device, an embodiment may parse the received user voice input (e.g., that received at 310) to identify at least one command within the voice input at 350. Once an embodiment identifies at least one command within the voice input at 350, an action may be taken based on the at least one command at 360. For example, an embodiment may receive the command "what's the weather," and proceed to inform the user of the current weather conditions (e.g., reciting the weather via a speaker, displaying the weather via a display, etc.).

If an embodiment has determined that the user's focus is not directed toward the device (e.g., the main device or a sub component thereof, e.g., an audio device such as a microphone or speaker) at 330, it may take no action at 340, as discussed herein. However, if the user's focus shifts, (e.g., to the audio capture device, TV, or other like device) while the user is speaking (e.g., inputting a voice command), an embodiment may perform an action based on the user input, even though the user focus on the audio capture device wasn't detected at the beginning of the voice input. For example, a user may, upon returning home, request the television be turned on while not initially looking at the audio capture device. However, the user may shift their focus to the audio capture device mid-statement, or shortly after issuing the command. Thus, an embodiment may interpret this mid or post statement focus shift as the user's intent to issue a command. In order to carry out this action, an embodiment may maintain a rolling buffer of user voice (e.g., 10 seconds, 30 seconds, etc.), which may be automatically refreshed as new user input is received.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at a device, voice input comprising at least one command;
    thereafter identifying, using an image of the user, a direction of user focus, wherein the direction of user focus is identified as not being directed toward the device;
    detecting a shift in user focus directed toward the device after the voice input is at least partially received; and
    responsive to detecting the shift in user focus, performing an action based on the at least one command.

2. The method of claim 1, wherein the image of the user is derived using at least one sensor; and
    wherein the at least one sensor is selected from a group consisting of: an image capture device, a video capture device, a range imaging device, and a 3D scanning device.

3. The method of claim 1, wherein the identifying a direction of user focus is based on a head location of the user.

4. The method claim 1, wherein the identifying a direction of user focus is based on a gaze location of a user.

5. The method of claim 1, wherein the image of the user is derived from a plurality of sensors.

6. The method of claim 1, further comprising:
    placing the device in a low power state based on identifying that the direction of user focus is not directed toward the device for a predetermined time.

7. The method of claim 1, further comprising
    waking up the device from a low power state based on identifying that the direction of user focus is directed toward the device.

8. The method of claim 1, further comprising changing a visual characteristic of the audio capture device in response to the user focus being directed toward device.

9. The method of claim 1, further comprising playing an audible notification in response to the user focus being directed toward the device.

10. An information handling device, comprising:
a processor;
an audio capture device operatively coupled to the processor; and
a memory that stores instructions executable by the processor to:
receive, at the audio capture device, voice input comprising at least one command;
thereafter identify, using an image of the user, a direction of user focus, wherein the direction of user focus is identified as not being directed toward the device;
detect a shift in user focus directed toward the device after the voice input is at least partially received; and
responsive to detecting the shift in user focus, performing an action based on the at least one command.

11. The information handling device of claim 10, wherein the image of the user is derived using at least one sensor; and
wherein the at least one sensor is selected from a group consisting of: an image capture device, a video capture device, a range imaging device, and a 3D scanning device.

12. The information handling device of claim 10, wherein the identifying a direction of user focus is based on a head location of the user.

13. The information handling device claim 10, wherein the identifying a direction of user focus is based on a gaze location of a user.

14. The information handling device of claim 10, wherein the image of the user is derived from a plurality of sensors.

15. The information handling device of claim 10, wherein the instructions are further executable by the processor to:
place the information handling device in a low power state based on identifying that the direction of user focus is not directed toward the information handling device for a predetermined time.

16. The information handling device of claim 10, wherein the instructions are further executable by the processor to:
wake up the information handling device from a low power state based on identifying that the direction of user focus is directed toward the information handling device.

17. The information handling device of claim 1, wherein the instructions are further executable by the processor to:
change a visual characteristic of the audio capture device in response to the user focus being directed toward the audio capture device.

18. A product, comprising:
a storage device having code stored therewith, the code being executable by the processor and comprising:
code that receives, at a device, voice input comprising at least one command;
code that thereafter identifies, using an image of the user, a direction of user focus, wherein the direction of user focus is identified as not being directed toward the device
code that detects a shift in user focus directed toward the device after the voice input is at least partially received; and
code that performs, responsive to detecting the shift in user focus, an action based on the at least one command.

* * * * *